Dec. 3, 1946.   B. WALKER   2,412,019
WAR VEHICLE FUEL TANK
Filed April 18, 1942
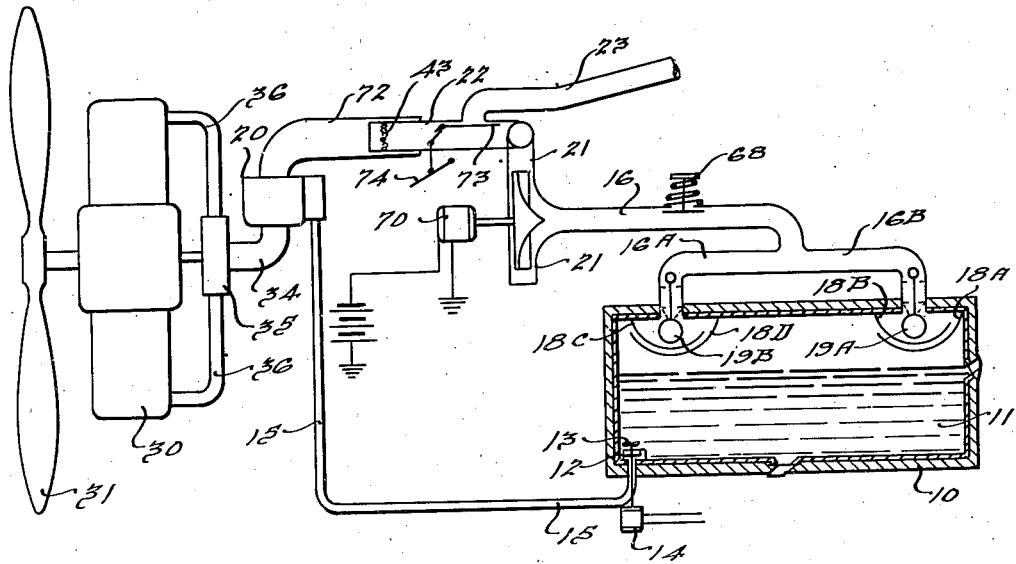
INVENTOR.
Brooks Walker.
BY
Harness, Dickey & Pierce.
ATTORNEYS.

Patented Dec. 3, 1946

2,412,019

UNITED STATES PATENT OFFICE 2,412,019

WAR VEHICLE FUEL TANK

Brooks Walker, Arlington, Va.

Application April 18, 1942, Serial No. 439,533

8 Claims. (Cl. 123—136)

This invention pertains to fuel tanks for combat vehicles which are subject to being punctured as a result of gunfire and/or enemy action. Heretofore, combat vehicles whether planes, tanks, cars, etc. have been drawn out of service or have been subject to bad fire hazards as soon as the fuel tanks containing combustible fuel were punctured by bullets, shrapnel, or other enemy action. To reduce the hazard, various types of resilient coatings, liners etc. containing rubbers, synthetic rubbers, leathers, fibers etc. have been employed to provide self-sealing types of tanks. However, with self-sealing tanks, holes pierced by small or large cannon, even 50 millimeter machine-gun fire, shrapnel, etc., are holes which such self-sealing tanks are incapable of repairing automatically. Furthermore, the weight of such self-sealing tanks is very great, which is a decided detrimental factor on planes, as it cuts down the load and bomb carrying capacity. Also, the rubber used in many self-sealing tanks is quite a critical element in time of war.

This invention is based on a different principle, whereby a partial vacuum is applied by engine power or auxiliary power, passing air velocity through venturi or similar action so as to overcome the static head of the fuel in the tank, plus some safety factor and increase in G due to bumpy air, acceleration, etc., so that when the tank is punctured, air from the outside will leak into the tank from the outside, rather than fuel leaking out from the inside of the tank. This invention may also apply to other liquid-containing tanks on vehicles such as oil tanks, water tanks, radiators etc. where it is desired to prevent liquid leakage after the tank is punctured.

The invention is further explained by referring to the claims hereof, as well as to the accompanying drawing.

The invention is best illustrated by referring to the accompanying drawing in which the figure is a diagrammatic view, partly cut away, showing a preferred form of the invention.

In the figure, I have shown a fuel tank 10 which may preferably be of the self-sealing type, if weight is not too much of a factor, as when used on a plane. Said tank carries a supply of inflammable fuel 11 and if used on high altitude planes, is preferably supplied with a motor-driven fuel pump 12, located within the fuel tank, and above this fuel pump is an agitator 13 operating in the fuel to draw the entrapped air bubbles out of the fuel prior to intake into the fuel pump which is driven by the electric motor 14. This fuel pump arrangement is nothing novel and is standard practice on some modern aviation designs. Fuel from this pump 12 passes through line 15 to engine carburetor 20. The fuel tank has a suitable air-tight filler cap not shown in this drawing of any standard construction.

An engine 30 drives a propeller 31 in case of aviation application and the air intake 72 of the engine communicates with the atmosphere around an outlet pipe 22 of a blower 21. The air from the intake 72 alone or combined with the air or mixture delivered by the blower 22 is delivered to the carburetor 20. From the carburetor 20 the fuel mixture passes through a manifold pipe 34 to a supercharger or mixer 35 and is then delivered through manifolds 36 to the engine cylinders. When the plane is in combat and subject to fire by enermy forces whether on the ground or by other planes, the pilot or operator actuates a motor 70 of the blower 21 to produce a suction in a pipe 16 connected to one or more of the fuel tanks 10. The suction produced by the blower 21 in the pipe 16 produces a vacuum in the fuel tank at spaced points through the two parts of the manifold 16A and 16B. Two manifolds are used so that when the plane is in a vertical climb or a vertical dive, suction can be applied to the tank at the position above the fuel in either case. To prevent fuel from being drawn out of the manifolds 16A or 16B when the tank has been badly punctured by enemy action and a large amount of air is coming through the punctured holes whether above or below the fuel line, I have provided baffles 18A, 18B, 18C, and 18D formed of any suitable shape so as to offer suitable resistance towards flow of fuel into manifolds 16A and 16B due to slopping or bubbling action, without seriously interfering with the flow of the air or the air and fuel vapor into manifold 16.

As a further precaution, I have provided float check valves 19A and 19B yieldably urged off of their seats by suitable spring means, but so constructed that when the plane changes its line of climb or dive so that fuel comes up against either of these valves, it will float up to a closed seated position to prevent liquid fuel from being drawn out into the suction manifold 16.

A fire screen 43 is preferably imposed on the outlet pipe 22 so that a backfire from the engine or other source of flame could not be transferred through said screen to or from said fuel tank.

The vacuum in the tank is created through the action of auxiliary motor 70 which may be driven as a motor accessory or as an electric motor from the vehicle battery or as a wind motor or in any other manner that is suitable. The discharge from this pump which may only be put into operation when in combat or after the fuel tank has been punctured, may either be discharged (1) into the intake 72 which is the intake to the carburetor of the engine so that the fuel contained in the air from pipe 16 which may have passed from a bullet hole through the fuel and therefor contains considerable fuel value may be suitably used in combustion within the motor, or (2) through the action of control valve 73 controlled by handle 74 within the operator's compartment, may discharge through intake 23 to the exterior of the plane or vehicle so as not to interfere with the carburetion of the motor during critical maneuvers, such as fights, landing, etc., on a plane when any erratic operation of the motor might be detrimental. It is to be understood that the suction to be applied to the tank of the plane might be provided by extending the pipe from the fuel tank to a proper location in a wing where suitable suction might be available from the air foil action, as for instance in back of and on top of the leading edge of the wing so that the action of the air in passing the wing would create the desired suction to prevent fuel from leaking out of the tank when punctured.

The use of the blower driven by the separate motor 70 has the advantage of preventing leaks right up to the time that the plane stops and even thereafter so that the leaks could be properly plugged while the plane is still standing, or ample fire protection could be available before the suction on the tank was released to allow the fuel to leak out. The pipe 16 is provided with a spring-loaded relief valve 68 to control the maximum vacuum which can be applied to the fuel tank from which the pipe 16 leads. With this arrangement the blower 21 may be operated at maximum capacity when placed in operation by the pilot when traveling in areas in which projectiles may puncture the tank. As long as the tank is not punctured, the relief valve 68 will be open a maximum amount so that only a maximum amount of vacuum will be present in the tank. When the tank is punctured more air will be drawn therefrom by the blower and the relief valve 68 will move toward closed position. As the punctures in the tank become more numerous or enlarged, the valve will continue to move toward its closed position, drawing more and more of the air through the openings in the tank and less through the opening in the relief valve. In this manner an automatic control is provided for regulating the maximum amount of vacuum which is produced in the self-sealing fuel tanks during the time the blower producing the vacuum is operating at its maximum capacity.

When the tank 10 has been punctured, the exhaust from the blower 21 delivered to the engine from the pipe 22 and intake 72 becomes enriched from the fumes of the fuel which over-enriches the charge delivered to the engine and cylinders. When this occurs, the operator actuates the handle 74 for adjusting the valve 73 for exhausting a part or all of the mixture delivered from the blower 21 through the pipe 23 into the atmosphere. In such an arrangement, the blower 21 functions in the manner of supercharger for supplying a pressure of air or fuel mixture to the intake 72 of the carburetor 20 which aids in the efficient operation of the engine at high altitudes.

With this construction, it can be seen that the combat vehicle can continue to fight and continue to utilize its fuel even though the tank is punctured and unsealed until such vehicle reaches its destination when such holes may be again repaired. Where the discharge from the tank leads into the manifold and goes to the engine, obviously corrections in the mixture in the carburetor must be made to compensate by such compensation devices as are readily available in present day aviation and automotive construction and are therefor not covered in detail in this application.

Other objects of this invention will be more particularly pointed out in the following claims. I also wish to point out that I do not wish to limit myself to the exact details and mode of operation set forth in this application and drawing, for it will be obvious that wide departure may be made in the way of details without departing from the spirit and scope of my invention, which is as set forth in the following claims.

I claim as my invention:

1. The combination with an engine having an intake, a fuel tank, and a fuel pump for supplying fuel from the tank to the engine, pump means for sucking from the top of said tank to continuously maintain a partial vacuum therein, and a valve means on the delivery side of said pump means for selectively delivering a major portion of the medium sucked from said tank to the intake of said engine or to the atmosphere away from said intake.

2. In a device operated by an internal combustion engine, a fuel tank, fuel delivering means including a pump interconnecting said tank and engine, means for creating a partial vacuum in said tank above the fuel contained therein, means for regulating the degree of vacuum created in said tank, a discharge conduit on said vacuum creating means, and means for directing the discharge from said discharge conduit to the atmosphere and to said fuel delivering means.

3. In a device operated by an internal combustion engine, a fuel tank, fuel delivering means including a pump interconnecting said tank and engine, means for creating a partial vacuum in said tank above the fuel contained therein, means for regulating the degree of vacuum created in said tank, a discharge conduit on said vacuum creating means, means for directing the discharge from said discharge conduit to the atmosphere and to said fuel delivering means, and means for adjusting the amount of discharge directed to the atmosphere and the fuel delivering means.

4. The combination with a fuel tank for a vehicle and an engine by which the vehicle is operated, said engine having an intake conduit, of means for discharging gas from said tank for applying a controlled partial vacuum thereto above the fuel therein and maintaining said partial vacuum in the presence of the hole in the tank wall, and means for selectively directing the discharge from said tank to said conduit and to the atmosphere.

5. The combination with a fuel tank and a vehicle driven by an engine which is operated by the combustion of a fuel, of means including a pump for supplying fuel to said engine, means for discharging gas from said tank to create a partial vacuum therein above the fuel level, means for increasing said discharge in the presence of a puncture in the wall of said tank, and means for selectively directing said discharge into the fuel supply means for the engine and to the atmosphere.

6. The combination with a fuel tank and a vehicle operated by an engine by the combustion of a fuel, of means including a pump for supplying fuel to said engine, means for discharging gas from said tank to create a partial vacuum therein above the fuel level, means for increasing said discharge in the presence of a puncture in the wall of said tank, means for directing said discharge to the fuel supply means of said engine before said tank is punctured, and means for directing at least a portion of said discharge to the atmosphere after the occurrence of a puncture.

7. The combination with a fuel tank and a vehicle operated by a fuel consuming engine, a pump for delivering liquid fuel from said tank to said engine, means for supplying air to said fuel, means for discharging gas from said tank to create a partial vacuum therein above the fuel level and directing said discharged gas into said gas supplying means, means for regulating the amount of discharge of said gas from said tank which is delivered to said air supplying means after the occurrence of a puncture in said tank, and means for conducting the remainder of said discharged gas not delivered to said means to the atmosphere.

8. The combination with a fuel tank for a vehicle and a fuel consuming engine by which the vehicle is driven, fuel supply means for the engine including a pump a suction and gas discharge producing device connected to said tank for producing a partial vacuum therein, a regulating valve in the suction portion of said device for controlling the amount of vacuum produced in said tank, means for connecting the discharge portion of said device to the fuel supply for the engine, and means for connecting said discharge portion to the atmosphere and means for regulating the ratio of discharge of said gas which is delivered to the fuel supply for the engine and to the atmosphere.

BROOKS WALKER.